United States Patent
Lubrina et al.

(10) Patent No.: US 6,637,425 B2
(45) Date of Patent: Oct. 28, 2003

(54) DEVICE FOR SUPPORTING AND LOCATING A GAS BURNER IN A COOKER

(75) Inventors: Yves Lubrina, Poligny (FR); Michel Girod, Poligny (FR)

(73) Assignee: Thirode Grandes Cuisines Poligny, Poligny (FR)

( * ) Notice: Subject to any disclaimer, the term of this patent is extended or adjusted under 35 U.S.C. 154(b) by 0 days.

(21) Appl. No.: 10/046,780

(22) Filed: Jan. 17, 2002

(65) Prior Publication Data

US 2002/0092515 A1 Jul. 18, 2002

(30) Foreign Application Priority Data

Jan. 18, 2001 (FR) .............................. 01 00681

(51) Int. Cl.[7] .............................................. F24C 15/10
(52) U.S. Cl. ................. 126/39 B; 126/214 A
(58) Field of Search ........................... 126/39 B, 214 A, 126/39 E, 49

(56) References Cited

U.S. PATENT DOCUMENTS 2,650,586 A * 9/1953 Mills ........................ 126/39 B
3,982,523 A * 9/1976 Love et al. ................ 126/19 R
4,616,626 A * 10/1986 Kwan Soon ............... 126/39 K
5,336,084 A * 8/1994 Long .......................... 431/354
6,318,357 B1 * 11/2001 Muhle et al. ............. 126/39 R
6,322,354 B1 * 11/2001 Carbone et al. ............ 431/284
6,422,231 B1 * 7/2002 Hamilton et al. ............. 126/38

FOREIGN PATENT DOCUMENTS

FR        2603687    * 11/1988
GB         874681      8/1961

* cited by examiner

Primary Examiner—Alfred Basichas
(74) Attorney, Agent, or Firm—Young & Thompson

(57) ABSTRACT

A device for supporting a gas burner mounted cantilever fashion on a wall of a water tank and for locating the burner relative to a safety/igniter system fixed to another wall of the tank. The burner and the safety/igniter system cooperate when mounting the burner to enable the burner to rest on the system, namely through at least one notch in the bottom edge of a skirt of the burner and a rod projecting from the system and having at its free end a neck of smaller section followed by a head of larger section. Applications include assemblies of two burners joined together.

6 Claims, 5 Drawing Sheets

FIG_1
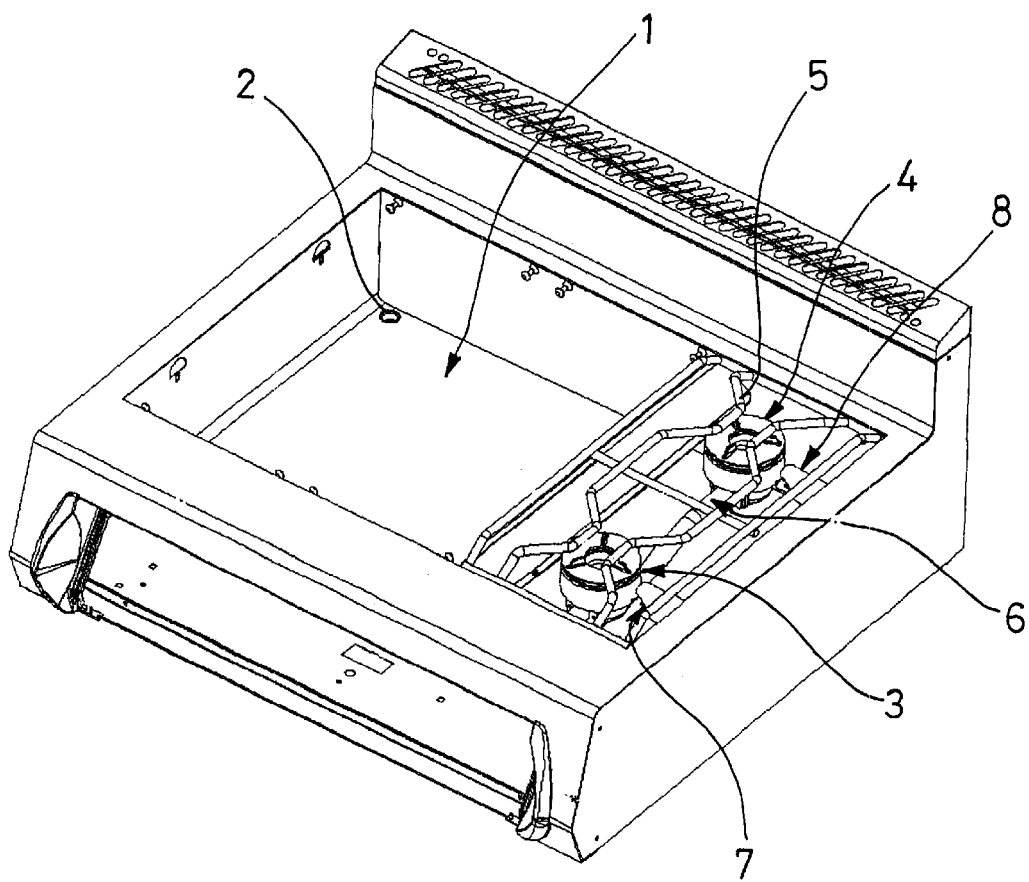

FIG_2
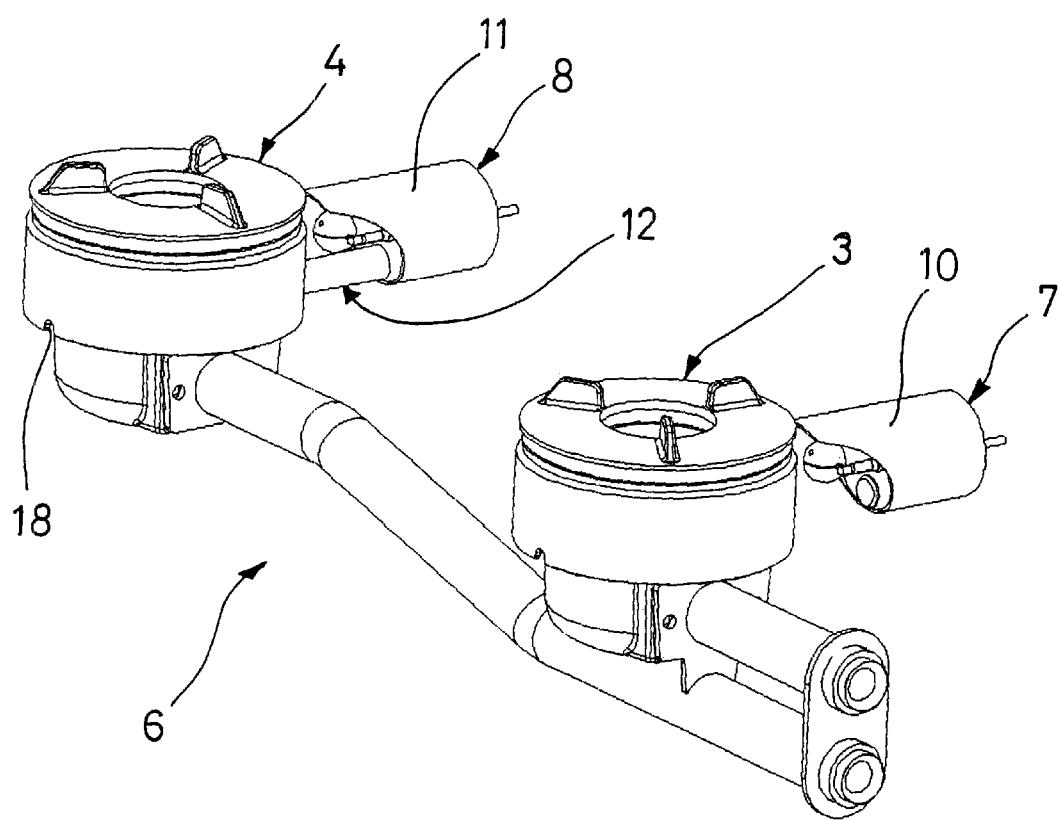

FIG_3
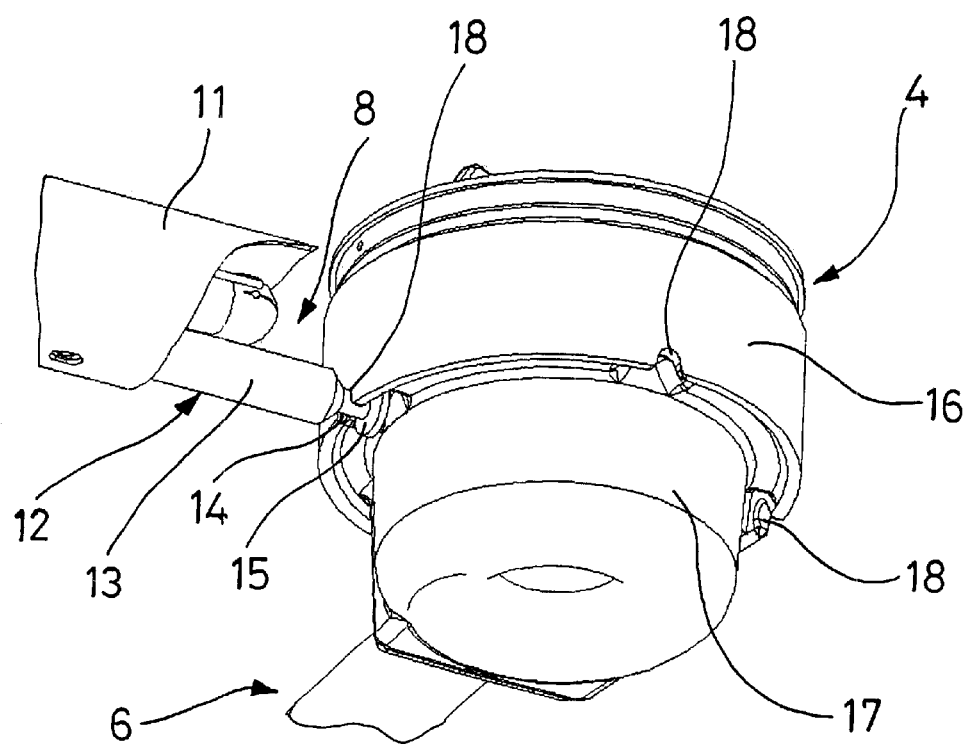

FIG_4
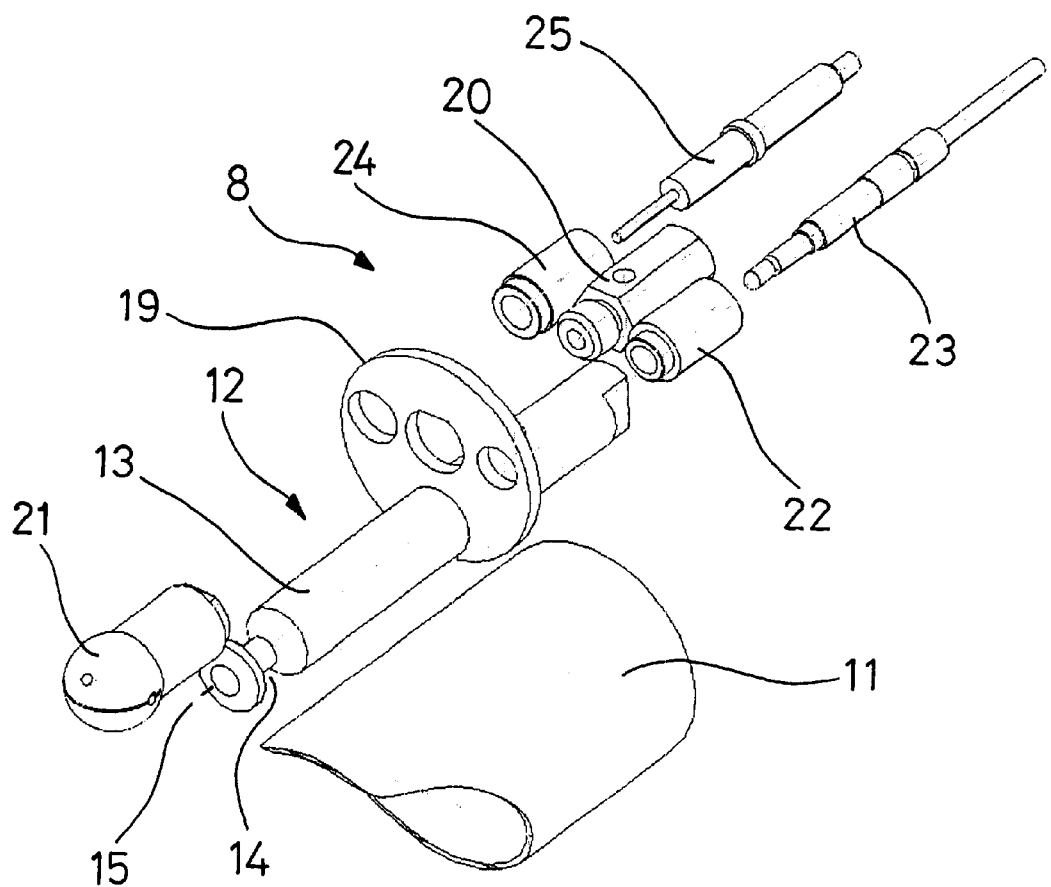

FIG_5
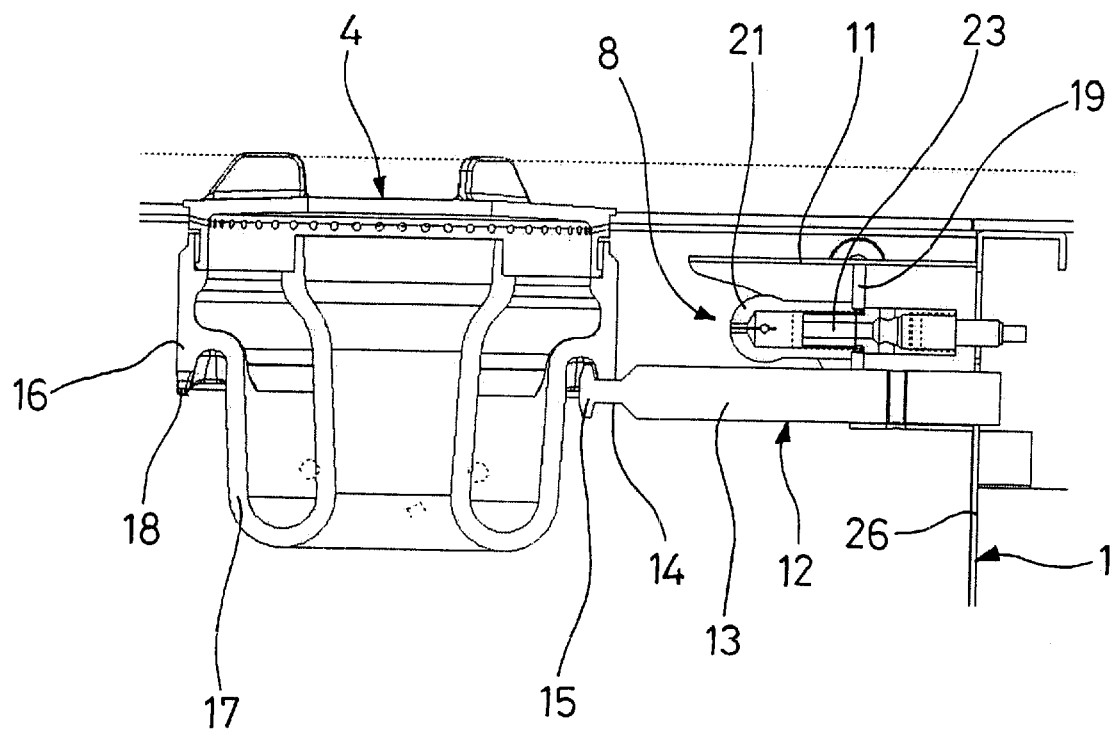

DEVICE FOR SUPPORTING AND LOCATING A GAS BURNER IN A COOKER

BACKGROUND OF THE INVENTION

1. Field of the Invention

The present invention relates to a device for supporting a gas burner mounted cantilever fashion on a wall of a tank for collecting spills, and for locating the burner relative to a safety/igniter system fixed to another wall of the tank.

2. Description of the Prior Art

In domestic cookers, the gas burners are generally placed directly on a flat support, for example a pressed stainless steel plate. This fixed mounting has the advantage that cleaning requires few handling operations, with only the grid to be removed from the burner. The flat support offers a continuous surface that is easy to clean. Location is accurate and reliable.

However, the above solution can be used only for low-power burners, because the burners are close to the plane of the grid. Also, because the support plane is close to the burner flame exit, spills are carbonized on the flat support and become difficult to remove.

In professional cookers, the above solution is often unsatisfactory because of the limited power of the burners.

To solve the problem of spills becoming carbonized, and the resulting cleaning problems, in professional cookers it is usual to spread aluminum foil over the surface of the flat support and to discard the aluminum foil at the end of a shift, to avoid the fastidious cleaning task.

When it comes to high-power burners, most professional equipment manufacturers offer solutions combining a fixed or demountable burner located at some distance above a spill recovery device including a removable tank or a removable cleaning drawer. Some tanks can receive water, poured into them manually, to prevent carbonization of grease.

The removable drawers or tanks presuppose tops that are not sealed against spills, and most importantly against cleaning water. There are interstices between the tanks or drawers and the supports and between the burners (when they are demountable) and the tanks, and in practice these interstices do not prevent various kinds of infiltration.

Moreover, once the drawers or tanks have been removed, nothing prevents the infiltration of various kinds of discharge into the body of the equipment.

The removable drawers or tanks are intended to contain water, but in reality they are rarely used with water. At the end of a shift, removing the drawer or tank full of water is problematical from the ergonomic point of view. It is even difficult not to spill its contents into the equipment (because of a wave effect, and the varying height of the sides above the surface of the water), especially as the drawer or tank is often hot. The removable side of the drawer or tank often prevents the provision of a water inlet and imposes manual filling, which is even more of a nuisance for users as the water quickly evaporates during a shift. Burnt on spills are then again a problem.

What is more, thorough cleaning presupposes numerous handling operations, such as having to remove the grids, the burners and the tank before obtaining access to the internal walls.

Finally, safety and igniter systems, which must be fixed, rather than removable, are disposed near the burners. Current arrangements do not protect the safety and igniter systems effectively. Frequent handling of the burners and tanks leads to repeated knocks, which can degrade the safety and igniter systems prematurely.

In an attempt to remedy these drawbacks and to solve most of the problems referred to above, it has already been proposed to use a fixed, sealed, welded water tank equipped with a drain with no discontinuities in its surfaces. Above the tank is disposed an assembly comprising two burners joined together (a proximal burner and a distal burner), with a horizontal gas inlet, and mounted cantilever fashion on a vertical wall of the tank. A safety and igniter system (comprising a pilot light, a thermocouple and an igniter electrode) for each burner is fixed to a wall of the tank, with a protective arrangement to protect it from knocks and spills.

The principal advantage of this solution is that it is virtually ideal from the hygiene point of view. The deep tank is in practice always used with water in it, because filling it is very simple (requiring no handling of the tank). A fixed water inlet is even provided on the front wall of the tank which, in conjunction with an overflow siphon for draining the tank, makes it very easy to use. Ordinary cleaning does not necessitate handling any of the accessories. It is generally sufficient to drain the tank and to give a quick wipe with a cloth, without even removing the grid. Should it be necessary to clean the bottom of the tank using a sponge, the burner assembly can be removed, without using tools, to expose the smooth surface of the bottom of the tank. The sealed and fixed tank offers a sealed solution with no possibility of infiltration of spills. With regard to reliability, the pilot light, the thermocouple and the igniter electrode are well protected from knocks and spills.

There are still some drawbacks, however. Thus, because of the weight and the length of the combination of two burners, it is difficult to ensure accurate relative location of the burner and the pilot light, both vertically (risk of sagging due to the weight of the combination of burners) and laterally (left/right). Sagging of the burner assembly leads to a loss of efficiency, especially of the distal burner, because of the distance of the burner from the bottom of the pan, and can lead to heating of the walls of the tank. Another drawback relates to reliability; even if the location of the burner assembly is correct at the outset, repeated handling of the assembly can cause it to sag to a greater or lesser degree.

To attempt to remedy this problem of sagging, it is possible to add "struts" resting on the bottom. However, these struts are in contact with the water in the tank and prevent cleaning the bottom with a sponge without removing the burner.

The burner assembly must be mounted cantilever fashion on the front wall of the tank. The necessity to be able to demount the burner assembly for cleaning, without using any tools, makes it very difficult to obtain a compromise such that minimal clamping nevertheless provides sufficient immobilization to locate the burners. This is why, in practice, either the user has routinely to demount the burner assembly, and its fixing is therefore not very precise, in which case location is a somewhat hit and miss affair, or its fixing is tight, to improve location, in which case the user generally ceases to demount the burner assembly.

This solution, even if it constitutes real progress, is therefore still open to improvements in relation to cleanability, accurate location of the burners relative to the pilot lights, and combustion efficiency (i.e. the location of the burners relative to the grid), as well as the reliability/durability aspect, associated with demounting and replacing the burner assembly for cleaning, which reduces the accuracy of its location.

The present invention is aimed at a device for supporting and locating gas burners which remedies the drawbacks of prior art solutions by combining the facility for very simple mounting/demounting with guaranteed, permanent and very accurate relative location of the burners and the pilot lights. The invention is also aimed at a device for supporting and locating gas burners which provides the required mounting/demounting and location functions at low cost and without impeding the cleaning of surfaces.

SUMMARY OF THE INVENTION

The invention provides a device for supporting a gas burner mounted cantilever fashion on a wall of a spill recovery tank and for locating the burner relative to a safety/igniter system fixed to another wall of the tank, in which device the burner and the safety/igniter system cooperate when the burner is mounted to enable the burner to rest on and locate itself on the safety/igniter system to immobilize the burner relative to the safety/igniter system.

The burner preferably includes a downwardly open opening and the safety/igniter system preferably includes locating means having a shape matching the shape of the opening to enable the opening to locate thereon from above in order to immobilize the burner vertically and laterally.

The locating opening on the burner can be formed in the bottom edge of an external skirt extending downwardly over the burner pot and the locating means on the safety/igniter system can include a rod projecting horizontally from the system and having at its free end a neck of smaller section, matching the notch, followed by a head of larger section.

Thus, when mounting the burner, the notch in the burner nests over the neck of the rod, which immobilizes the burner relative to the safety/igniter system.

In the context of the invention, the burner is preferably part of an assembly of two burners joined together and comprising a proximal burner and a distal burner, the former close to and the second far away from the mounting of the burner assembly on the wall of the tank, only the distal burner and the safety/igniter system associated with the distal burner including support and locating means in accordance with the invention.

The rod constituting the locating means and projecting over the safety/igniter system can advantageously be fastened to a fixing plate also supporting the pilot light, the thermocouple, and the igniter electrode of the safety/igniter system.

The rod is preferably disposed under the pilot light, the thermocouple, and the igniter electrode, all of which are covered by a protective cap.

Thanks to the device according to the invention, the burner or the pair of burners joined together is not attached rigidly, involving clamping it to the front of the tank. Each burner, or the distal burner of the integral pair of burners, can include a skirt with a plurality of notches distributed around its circumference, providing a plurality of locating positions in different configurations.

Thanks to the particular conformation of the locating means, it is sufficient to mount the burner or the burner assembly on the front wall of the tank, with no rigid attachment involving clamping, and without requiring any particular handling operations, and to place it on the locating means provided on the safety/igniter system fixed to a lateral wall of the tank. The burner's own weight then immobilizes it accurately. Because no fixing of the burner or the burner assembly is necessary, either to the front wall of the tank or to the lateral wall, the burner or the integral pair of burners can be removed instantly for cleaning.

It should be noted that the burner or burner assembly applies no torque to the wall of the tank, which can therefore be thin.

In a preferred embodiment a plurality of assemblies of two burners joined together can be mounted in this manner on the same water tank, which is advantageously equipped with a drain and a water inlet, which further facilitates cleaning in that it is necessary to drain and rinse only one tank having fewer exposed surfaces and fewer corners.

An illustrative and non-limiting embodiment of a support and locating device according to the invention will be described in more detail hereinafter with reference to the accompanying diagrammatic drawings.

BRIEF DESCRIPTION OF THE DRAWINGS

FIG. 1 is a top perspective view of a hob including a plurality of burners disposed above a common water tank.

FIG. 2 is a perspective view of a burner assembly from the FIG. 1 hob comprising two burners (proximal burner, distal burner) and safety/igniter systems associated with said burners.

FIG. 3 shows the safety/igniter system associated with the proximal burner from FIG. 2, and the support and location means for that burner.

FIG. 4 is an exploded view of the safety/igniter system from FIG. 3 and the locating means associated therewith.

FIG. 5 is a detail view showing the support and location means of the distal burner from FIG. 2.

DETAILED DESCRIPTION OF THE PREFERRED EMBODIMENT

In FIG. 1, a water tank 1 of a hob including a plurality of gas burners installed at a distance above the bottom of the tank 1 has a drain 2 at the rear and a water inlet (not shown) on the opposite side, i.e. at the front. The hob can include four burners, for example, or even six burners. FIG. 1 shows only one assembly of two burners, comprising a front (proximal) burner 3 and a rear (distal) burner 4, which are covered by a common grid 5. As shown in FIG. 2 especially, the two burners 3 and 4 are combined to form a burner assembly 6 mounted cantilever fashion on the front wall of the tank 1 by mounting means involving no clamping and requiring no tools.

Two safety/igniter systems 7, 8 are respectively associated with the burners 3 and 4, each of the systems 7, 8 including a pilot light, a thermocouple and an igniter electrode, as will be described in more detail with reference to FIG. 4.

The two safety/igniter systems 7, 8 are mounted on a lateral wall of the tank 1.

In FIG. 2, the safety/igniter system 7 associated with the proximal burner 3 of the burner assembly 6 and mounted on a lateral wall of the tank, not shown here, is, in the usual way, at a small distance from the burner 3, the system being covered by a protective cap 10, which protects the system 7 from knocks and spills.

The safety/igniter system 8 associated with the distal burner 4, and mounted on the same lateral side of the tank includes, in addition to its protective cap 11, comparable to the cap 10 of the assembly 7, locating means 12 which cooperate with the burner 4 to support and locate the burner assembly 6, and therefore to support and locate the burner 4 and the burner 3 simultaneously.

FIG. 3 shows that the locating means 12 include a member 13 in the form of a rod projecting horizontally and cantilever fashion over the safety/igniter system 8. The free end of the rod 13 has a neck 14 of smaller section followed by a head 15 of larger section.

To cooperate with the locating means 12, the burner 4 includes a skirt 16 which projects downward around the burner pot 17 and has a plurality of notches 18 disposed around the perimeter of its bottom edge. In the example shown the skirt 16 has three notches 18 offset at 90° to each other.

FIG. 4 is an exploded view of the safety/igniter system 8 with the locating means 12, and shows that the rod 13 is fastened, in the vicinity of its end opposite the head 15, to a fixing plate 19 which further includes holes for the injector 20 of a pilot light 21, for a mount 22 of a thermocouple 23, and for a mount 24 of an igniter electrode 25.

The same components are shown in FIG. 5, which illustrates, among other things, the fixing of the safety/igniter system 8 with the locating means 12 to the lateral wall 26 of the tank 1 and the cooperation of one of the notches 18 of the burner 4 with the neck 14 of the rod 13 of the locating means 12.

Thanks to the provision of a plurality of notches 18 in the skirt 16 of the burner 4, the same assembly 6 of two burners 3 and 4 can be mounted in the same tank 1 either on the right (as shown in FIG. 1) or on the left, by respectively attaching the burner 4 to the safety-igniter system 8 on the right-hand lateral wall 26 of the tank 1 or on its opposite lateral wall (FIG. 1 does not show the left-hand burner assembly 6 and the corresponding safety/igniter systems).

Of course, the locating means 12 associated with a safety-igniter system 8 could equally well be used as support and locating means for an individual burner rather than for an assembly of two burners joined together, as in the example shown.

Moreover, the locating means 12 and the corresponding means provided on the burner could be different from those shown by way of illustrative example in the drawings, in that the latter means are designed to guarantee accurate immobilization of the burner vertically and laterally, without instantaneous fitting and removal of the burner requiring the use of any tools whatsoever.

What is claimed is:

1. A device for supporting a gas burner mounted cantilever fashion on a wall of a spill recovery tank and for locating the burner relative to a safety/igniter system fixed to another wall of said tank, in which device said burner and said safety/igniter system are adapted to cooperate when said burner is mounted to enable said burner to rest on said safety/igniter system to immobilize said burner relative to said safety/igniter system.

2. The device claimed in claim 1, wherein said means include, on said burner, a downwardly open opening and, on said safety/igniter system, locating means having a shape matching the shape of said opening to enable said opening to locate thereon from above in order to immobilize said burner vertically and laterally.

3. The device claimed in claim 2, wherein said opening includes at least one notch formed in the bottom edge of an external skirt extending downwardly over the burner pot and said locating means include a rod projecting horizontally from said safety/igniter system and having at its free end a neck of smaller section followed by a head of larger section.

4. The device claimed in claim 1, wherein said burner is part of an assembly of two burners joined together and comprising a proximal burner and a distal burner, the former close to and the second far away from the mounting of said burner assembly on said wall of said tank, only said distal burner and said safety/igniter system associated with said distal burner including support and locating means.

5. The device claimed in claim 3, wherein said rod of said locating means is fastened to a fixing plate also supporting a pilot light, a thermocouple, and an igniter electrode of said safety/igniter system.

6. The device claimed in claim 1, wherein said locating means are disposed under said safety/igniter system covered by a protective cap.

* * * * *